(12) United States Patent
Talbot

(10) Patent No.: US 7,694,031 B2
(45) Date of Patent: Apr. 6, 2010

(54) MEMORY CONTROLLER INCLUDING A DUAL-MODE MEMORY INTERCONNECT

(75) Inventor: Gerald R. Talbot, Concord, MA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 260 days.

(21) Appl. No.: 11/590,286

(22) Filed: Oct. 31, 2006

(65) Prior Publication Data

US 2008/0147897 A1 Jun. 19, 2008

(51) Int. Cl.
*G06F 13/00* (2006.01)
*G06F 13/12* (2006.01)
*G06F 12/00* (2006.01)
*G06F 3/00* (2006.01)

(52) U.S. Cl. .............................. 710/14; 710/8; 710/11; 710/52; 710/62; 710/63; 710/64; 710/72; 710/74; 710/104; 710/305; 711/100; 711/111

(58) Field of Classification Search .................. 710/8, 710/11, 14, 52, 62–64, 72, 74, 104, 305; 711/100, 111
See application file for complete search history.

(56) References Cited

U.S. PATENT DOCUMENTS

| | | | | |
|---|---|---|---|---|
| 6,150,965 | A * | 11/2000 | Carr et al. | 341/101 |
| 6,304,930 | B1 * | 10/2001 | Yamauchi | 710/106 |
| 6,377,640 | B2 | 4/2002 | Trans | |
| 6,510,487 | B1 * | 1/2003 | Raza et al. | 711/100 |
| 6,845,420 | B2 * | 1/2005 | Resnick | 710/303 |
| 7,047,330 | B2 * | 5/2006 | Kovacevic | 710/58 |
| 7,293,124 | B2 * | 11/2007 | Nakabayashi | 710/71 |
| 7,313,639 | B2 | 12/2007 | Perego et al. | |
| 2004/0098545 | A1 | 5/2004 | Pline et al. | |
| 2004/0230718 | A1 | 11/2004 | Polzin et al. | |
| 2004/0236877 | A1 | 11/2004 | Burton | |
| 2006/0034358 | A1 | 2/2006 | Okamura | |
| 2007/0109019 | A1 | 5/2007 | Wu | |
| 2007/0121389 | A1 | 5/2007 | Wu | |
| 2007/0162670 | A1 | 7/2007 | Yang | |

FOREIGN PATENT DOCUMENTS

WO 2006-083899 8/2006

OTHER PUBLICATIONS

PCT Search Report for International application No. PCT/US2007/022814 dated Jan. 4, 2008, 11 pages.

\* cited by examiner

*Primary Examiner*—Tanh Q Nguyen
(74) *Attorney, Agent, or Firm*—Meyertons, Hood, Kivlin, Kowert & Goetzel, P.C.; Stephen J. Curran

(57) ABSTRACT

A memory controller including a dual-mode memory interconnect includes an input/output (I/O) circuit including a plurality of input buffers and a plurality of output drivers. The I/O circuit may be configured to operate in one of a first mode and a second mode dependent upon a state of a mode selection signal. During operation in the first mode, the I/O circuit may be configured to provide a parallel interconnect for connection to one or more memory modules. During operation in the second mode, the I/O circuit may be configured to provide a respective serial interconnect for connection to each of one or more buffer units, each configured to buffer memory data that is being read from or written to the one or more memory modules.

21 Claims, 9 Drawing Sheets

MEMORY CONTROLLER INCLUDING A DUAL-MODE MEMORY INTERCONNECT

BACKGROUND OF THE INVENTION

1. Field of the Invention

This invention relates to computer memory systems and, more particularly, to data transfer between a memory controller and a memory unit.

2. Description of the Related Art

Computer systems employ many different types of system memory. One common type of system memory is implemented using removable memory modules. Memory modules come in different types and configurations. However in general, a memory module may be implemented as a printed circuit board having an edge connector and a number of memory devices. The memory module may be plugged into a socket located on a motherboard or other system board. A commonly used memory module is known as a dual in-line memory module (DIMM), although there are others. In other systems, memory devices may be non-removable and may be mounted directly to the motherboard or system board.

Computer system processor speed and performance have increased rapidly in recent history. However, system memory performance has typically lagged behind. As such, some system performance improvements may be limited by the performance of the system memory. Thus, improvements in system memory bandwidth and capacity may be of great concern to the system architect.

Although improvements in system memory performance are possible, these improvements are sometimes costly. As such, it may be desirable to improve system memory bandwidth and capacity while keeping costs down.

SUMMARY

Various embodiments of a memory controller including a dual-mode memory interconnect are disclosed. In one embodiment, the memory controller includes an input/output (I/O) circuit including a plurality of input buffers and a plurality of output drivers. The I/O circuit may be configured to operate in one of a first mode and a second mode dependent upon a state of a mode selection signal. During operation in the first mode, the I/O circuit may be configured to provide a parallel interconnect for connection to one or more memory modules. During operation in the second mode, the I/O circuit may be configured to provide a respective serial interconnect for connection to each of one or more buffer units, each configured to buffer memory data that is being read from or written to the one or more memory modules.

In one specific implementation, each respective serial interconnect includes a plurality of differential bidirectional data signal paths. Each differential bidirectional data signal path may convey data between a given buffer unit and the memory controller.

In another specific implementation, each respective serial interconnect includes a differential command signal path that may convey command information from the memory controller to a given buffer unit.

In another specific implementation, each respective serial interconnect includes a plurality of downstream differential unidirectional signal paths and a downstream unidirectional differential clock signal path. Each of the downstream differential unidirectional signal paths may convey data, address, and command information from the memory controller to the one or more buffer units. The downstream unidirectional differential clock signal path may convey a serial clock signal from the memory controller to each of the one or more buffer units.

In yet another specific implementation, each respective serial interconnect includes a plurality of upstream differential unidirectional signal paths. Each of the upstream differential unidirectional signal paths may convey data and cyclic redundancy code (CRC) information from one of the one or more buffer units to the memory controller.

Figure 1:
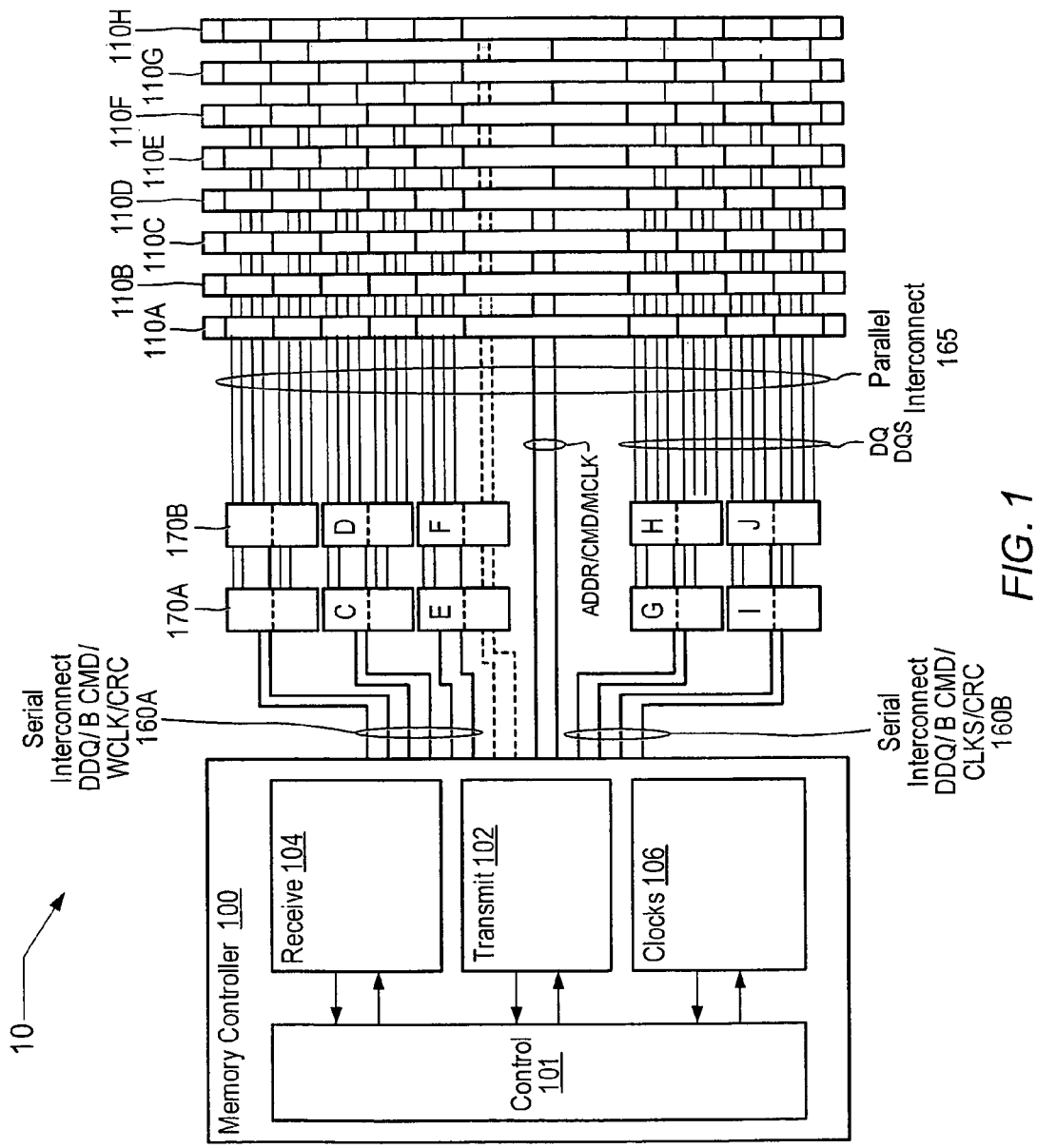
FIG. 1 is a block diagram of one embodiment of a memory system including a high-speed buffer.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Figure 5:
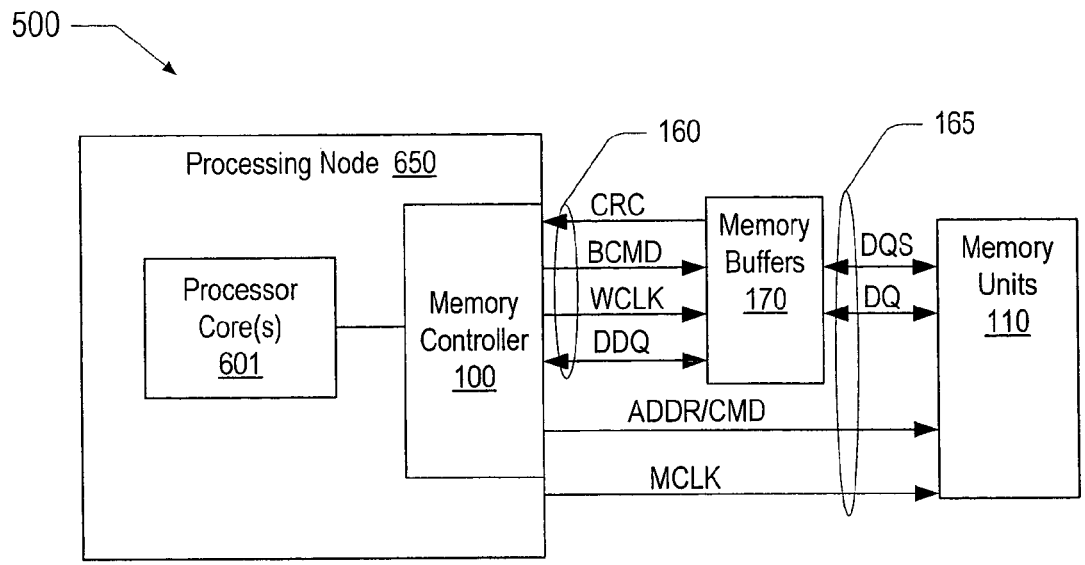
FIG. 5 is a block diagram of one embodiment of a computer system including the memory system shown in FIG. 1.

Turning now to FIG. 1, a block diagram of a memory system including one embodiment of a high-speed serial buffer is shown. Memory system 10 includes a memory controller 100 coupled to memory units 110A through 110H, and to buffer units 170A through 170J. It is noted that components that include a reference designator having a number and a letter may be referred to by the number only. For example, memory unit 110A may be referred to as memory unit 110 where appropriate. It is also noted that memory controller 100 may be a memory controller that is part of a chipset, such as may be used in a Northbridge arrangement. Alternatively, as shown in FIG. 5, memory controller 100 may be part of an embedded solution in which memory controller 100 is embedded within a processing node including one or more processor cores, for example.

In one implementation, memory units 110A-110H may be memory modules such as dual in-line memory modules (DIMM), for example. As such, each DIMM may include plurality of memory devices (not shown) such as devices in the dynamic random access memory (DRAM) family of memory devices, for example. However, it is noted that in general, memory units 110 of system 10 may be representative of any type of system memory.

In the illustrated embodiment, memory controller 100 is coupled to buffer units 170 via a high-speed serial interconnect 160A and 160B. In one embodiment, each high-speed serial interconnect 160 uses differential signaling techniques. High-speed serial interconnect 160 may include a plurality of differential bidirectional data signal paths (DDQ), differential buffer command signal paths (BCMD), differential clock signal paths (WCLK), and differential cyclic redundancy code signal paths (CRC). In the illustrated embodiment, there are two memory channels shown. As such, serial interconnect 160A may be used for one channel and is thus coupled to buffer units 170A through 170F, and serial interconnect 160B may be used for the other channel and is coupled to buffer units 170G through 170J. It is noted that in the illustrated embodiment, a portion of each of buffer units 170E and 170J are unused and as such may be used for other purposes, as desired.

In addition, memory controller 100 is coupled to memory units 110 via parallel interconnect 165. As shown, parallel interconnect 165 between memory controller 100 and memory units 110 may include address/command signal paths (ADDR/CMD), and clock signal paths (MCLK). Similar to the two serial interconnects shown, there are two ADDR/CMD/MCLK signal paths shown. Each of the ADDR/CMD/MCLK signal paths may be used for a respective memory channel. As shown, one of the ADDR/CMD/MCLK signal paths is coupled to memory units 110A through 110D, and the other ADDR/CMD/MCLK signal path is coupled to memory units 110E through 110H. Further, buffer units 170 are also coupled to memory units 110 via parallel interconnect 165. As shown, parallel interconnect 165 also includes data paths (DQ) and data strobe signal paths (DQS). In one embodiment, memory controller 100 may control operation of memory units 110 by sending addresses and commands via the ADDR/CMD signal paths.

As will be described in greater detail below, the DQ data paths may convey data in both directions between the buffer units 170 and memory units 110. The DQ data paths may include a number of eight-bit (byte-wide) data paths. For example, the fall data path may be 288 bits wide, but the full data path may be divided into byte-sized portions. It is noted that in one embodiment, the 288 bits may include four check bytes, while in other embodiments, other numbers of check byte may be used. It is also noted that the full data path may include any number of data bits, and be divided into different sized portions. The DDQ data paths of the serial interconnects 160 may convey serially the data that was conveyed via the parallel interconnect, and at higher speeds. For example, the DDQ0 signal path may convey data bits corresponding to DQ [0:3], the DDQ1 signal path may convey data bits corresponding to DQ [4:7], and the like, although other mappings are possible.

There are a variety of ways in which the data paths may be coupled to memory units 110. For example, it is contemplated that buffer units 170 may be part of a single integrated circuit. However, due to the number of pins that may be required for such an implementation, it may be impractical. As such, in one embodiment, the data path may be broken up and grouped into smaller units. Accordingly, in one embodiment, each of buffer units 170 may be a standalone integrated circuit that provides buffer functionality to a respective group.

In one embodiment, during write operations each serial buffer unit 170, may serially clock in and store two bytes, and then subsequently transmit those two bytes in parallel, on parallel interconnect 165. To obtain the necessary throughput, in one embodiment, the serial interconnect 160 may transfer data at four times the rate at which parallel interconnect 165 transfers data on the data signal paths. However, the ADDR/CMD signal paths and the MCLK signal paths may operate at half the rate of data paths of parallel interconnect 165. For example, the serial interconnect 160 may transfer data on the DDQ data paths at 6.4 GT/s, while the data signal paths DQ/DQS of parallel interconnect 165 may transfer data at 1600 MT/s, and the ADDR/CMD and MCLK signal paths may operate at 800 MT/s. It is noted that in other embodiments, serial buffer units 170 may store any number of bytes before transmitting them onto parallel interface 165. It is also noted that the serial interconnect 160 may be operated at any suitable data rate in relation to parallel interconnect 165.

CRC signal paths may convey CRC information from each buffer unit 170 to memory controller 100 via a respective unidirectional differential signal path. In addition, clock signal paths may convey WCLK signals to each of buffer units 170. Similarly, the BCMD signal paths convey buffer commands from the memory controller 100 to each of buffer units 170.

In one embodiment, memory controller 100 may control the operation of buffer units 170 via commands sent via the BCMD signal paths. As such, buffer units 170 may have a normal operation mode and a configuration and test mode. For example, during normal data operations memory controller 100 may send read and write commands for both data and pre- and post-ambles, to read and write the data storage, and to adjust the phase offset of the DQ signal paths. In addition, memory controller 100 may control the configuration, training and testing of the buffer units 170 by sending a variety of loopback commands, CRC control commands, and CRC training pattern commands, for example.

Figure 2:
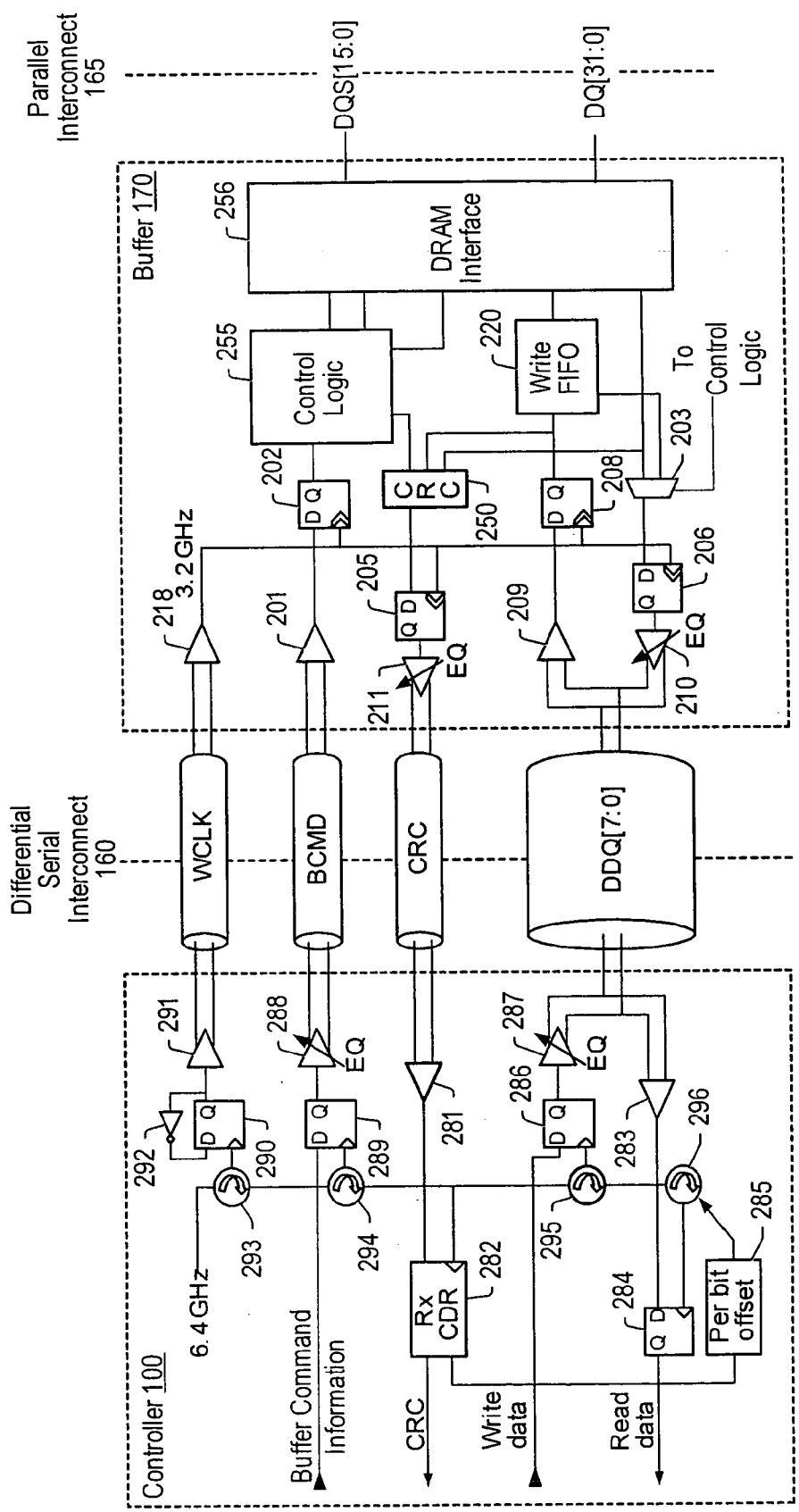
FIG. 2 is a diagram illustrating more detailed aspects of the memory system components of FIG. 1.

At high data rates the probability of buffer unit 170 or memory controller 100 receiving a bit error is significant. Accordingly, it may be necessary to protect transfers between memory controller 100 and buffer units 170 with an error detection code that will robustly detect multiple bit errors within a protected block. In one embodiment, a CRC code may be used to provide such multiple bit error detection. More particularly, as shown in FIG. 2, to simplify the logic in the buffer unit and/or the memory modules, and reporting of errors to memory controller 100, buffer unit 170 calculates a CRC based on either the data it is generating or the data that it is receiving. Accordingly, to transfer the CRC information back to memory controller 100, the unidirectional CRC signal paths may be used. As shown in FIG. 2, CRC unit 250 may calculate the CRC based on its internal data, and send the CRC data back to memory controller 100. When an error is detected on the link in either direction, memory controller 100 may correct the error by retrying the operation.

In one embodiment, the CRC information may be calculated and sent concurrently with the data on a transfer from buffer unit 170 to memory controller 100 so that the CRC may be available at the same time as the data block it is protecting when it reaches memory controller 100. In one embodiment, delays associated with calculating the CRC, may be mitigated by delays introduced on the data paths during write-to-read, and read-to-write transitions.

As mentioned above, many conventional systems control high-speed bidirectional communication by implementing control functions such as clock phase recovery, channel equalization, error detection, for example, in both communicating devices. However, as described in greater detail below, buffer unit 170 may be simplified making this type of control functionality asymmetric. As such, memory controller 100 may include control functionality that may dynamically and adaptively adjust the signal characteristics (e.g., phase, etc.) of transmitted write data to enable buffer unit 170 to correctly read the data based upon information received from buffer unit 170. In addition, memory controller 100 may adjust its internal receiver characteristics to enable memory controller 100 to receive data sent by buffer unit 170. Further, memory controller 100 may adjust the phase of clock signals that are provided to buffer unit 170 to enable address and command information to be correctly sampled.

More particularly, at high data rates the uncertainties of delays in the transmission path for different signals in a bus may require a per bit phase adjustment of a sample clock of a receiver of those signals. To avoid employing this circuitry in buffer unit 170, memory controller 100 may adjust the phase of its transmitted clock and data signals to avoid complex phase shifting circuits in the slave. As such, in the illustrated embodiment, memory controller 100 includes a control unit 101 that is coupled to a transmit unit 102, a receive unit 104, and a clocks unit 106. Control unit 101 may calculate phase information based on data received from buffer units 170 that may be used to adjust the phase of various clock edges within memory controller 100. For example, in response to such information as CRC data and read data, control unit 101 may control phase tracking and adjustment circuits (shown in FIG. 2) within transmit unit 102, receive unit 104, and clocks unit 106, respectively. This functionality is described in greater detail below in conjunction with the descriptions of FIG. 2 and FIG. 5.

Referring to FIG. 2, a diagram illustrating more detailed aspects of the memory system components of FIG. 1 is shown. Components that correspond to those shown in FIG. 1 are numbered identically for clarity and simplicity. Memory controller 100 is coupled to serial buffer 170 via a differential serial interconnect 160. It is noted that buffer unit 170 may be representative of any of buffer units 170A through 170J shown in FIG. 1. Accordingly, differential serial interconnect 160 includes a differential WCLK signal path, a differential BCMD signal path, a differential CRC signal path, and differential data signal paths DDQ[7:0].

Memory controller 100 includes a 6.4 GHz clock signal, which may be generated by clocks unit 106 of FIG. 1 is coupled to variable phase units 293, 294, 295, and 296, which may be part of clocks unit 106 and may provide the internal clock for memory controller 100. The outputs of variable phase units 293, 294, 295, and 296 provide the clock signal for flip-flops (FF) 290, 289, 286, and 284, respectively. The variable phase unit 293 is coupled to the clock input of FF 290. Since FF 290 has an inverter 292 coupled in a feedback loop to the input, the 6.4 GHz clock is output as a 3.2 GHz clock. The output of FF 290 is coupled to the input of a differential output driver 291, the output of which is coupled to the differential WCLK signal path. The write data is coupled to the input of FF 286. The output of FF 286 is coupled to a differential equalization output driver 287. The output of driver 287 is coupled to one signal path of DDQ[7:0]. Thus, for each signal path of DDQ[7:0], a similar write data output path (not shown) may be used. Likewise, for read data, one signal path of DDQ[7:0] is coupled to a differential input buffer 283, the output of which is coupled to the input of FF 284. The output of FF 284 is provided as read data to other portions (not shown) of memory controller 100. The CRC signal path is coupled to a differential input buffer 281, the output of which is coupled to the input of a receiver clock data recovery unit (Rx CDR) 282. RxCDR is coupled to per bit offset unit 285, which is coupled to variable phase unit 296. Buffer command information is provided to the input of FF 289. The output of FF 289 is coupled to a differential equalization output driver 288, which is coupled to the differential BCMD signal path.

Buffer unit 170 includes a buffer 209 that represents a differential input buffer for each of the DDQ[7:0] signal paths. Buffer 209 is coupled to receive the write data sent on one of the DDQ[7:0] signal paths. The output of buffer 209 is coupled to an input of FF 208. The output of FF 208 is coupled to write FIFO 220. The output of write FIFO 220 is coupled to a DRAM interface 256, which is representative of the input buffer and output driver circuits used to interface to the memory units 110 via parallel interconnect 165. As shown, there are 16 data strobe signal paths DQS[15:0] and 32 data signal paths DQ[31:0] as part of parallel interconnect 165. The write data from write FIFO may be output to the memory units 110 via DQ[31:0]. It is noted that although only the DQ and DQS signals are shown, other signals have been omitted for simplicity. It is also noted that although not shown as such for simplicity, the MCLK and DQS signals may be differential signals.

Read data from memory units 110 via DQ[31:0] is coupled through DRAM interface 256 to one input of a multiplexer (mux) 203. The output of mux 203 is provided to an input of FF 206. Control logic 255 controls the multiplexer input select of mux 203. The output of FF 206 is coupled to a differential equalization data output driver 210 which is coupled to one of the differential signal paths of DDQ[7:0].

Buffer unit 170 includes control logic 255 which is coupled to receive the buffer command information (BCMD) from memory controller 100 through input buffer 201, which is coupled to the input of FF 202. The BCMD information may cause control logic 255 to drive write data onto the DQ data paths, or to read data for the DQ data paths, or to enter and exit initialization sequences, etc. Thus, control logic 255 may control the DRAM interface 256, CRC unit 250, mux 203, as well as other circuits.

In the illustrated embodiment, the 3.2 GHz clock is coupled to the clock input of FF 202, 205, 208, and 206. Each of FF 202, 205, 208, and 206 is shown as a dual edge flip flop, meaning they are configured to latch the 'D' input on both the leading and trailing edge of the input clock signal. Accordingly, write data, and BCMD information may be conveyed at 6.4 Gb/s on their respective data paths, and input latched using the 3.2 GHz clock. Similarly, since memory controller 100 operates at 6.4 GHz, read data, and CRC information may be conveyed at 6.4 Gb/s on their respective signal paths and used within memory controller 100 during certain loop back modes.

In one embodiment, when write data is received, it is latched by FF 208 and stored to write FIFO 220. Write FIFO 220 may store the data until enough bits are received to be output to the memory units 110 via DRAM interface 256.

As will be described in greater detail below in conjunction with the description of FIG. 5, during operation, memory controller 100 may dynamically and adaptively adjust the signal characteristics (e.g., phase, etc.) of transmitted write data and its internal receiver characteristics, and adjust the phase of the 6.4 GHz clock which generates the 3.2 GHz clock that is provided to buffer unit 170. More particularly, as mentioned above, receive unit 104 includes sample clock phase adjustment circuits such as RxCDR 282 and offset unit 285 to adjust its own local sample clock phase to more optimally receive data transmitted by buffer unit 170. As such, whenever memory controller 100 is receiving CRC data from buffer unit 170, receive unit 104 may use RxCDR 282, offset unit 285 and variable phase unit 296 to adjust the clock phase of FF 284. In addition, control unit 101 within memory controller 100 may adjust variable phase unit 293 to adjust the phase of the 6.4 GHz clock signal provided to FF 290. During an initialization process such as during a power-on reset, for example, memory controller 100 may adjust variable phase unit 294 to adjust the phase of the 6.4 GHz clock signal provided to FF 289 to allow buffer unit 170 to correctly sample buffer command signals. Further, during initialization and during operation at predetermined intervals, control unit 101 may adjust variable phase unit 295 to adjust the phase of the 6.4 GHz clock signal provided to FF 286 to adjust the phase of the write data transmitted to buffer unit 170 to enable buffer unit 170 to more optimally receive the write data.

Figure 3:
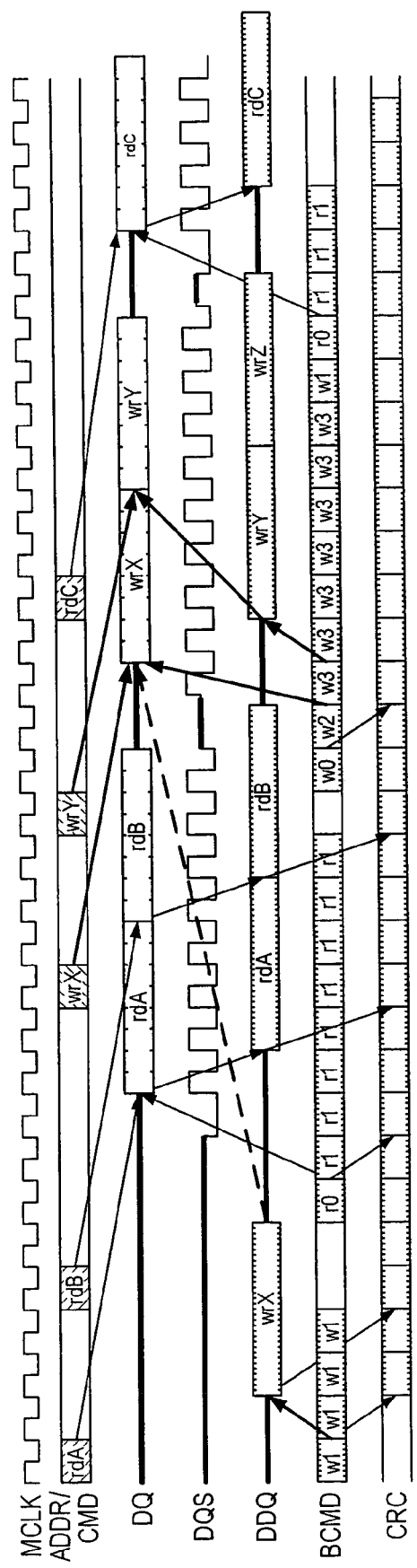
FIG. 3 is a timing diagram illustrating an exemplary burst operation of the embodiments shown in FIG. 1 and FIG. 2.

FIG. 3 is a timing diagram illustrating exemplary operation of the embodiments shown in FIG. 1 and FIG. 2 during an eight-bit burst. More particularly, the timing diagram shows a 128-byte read/write/read burst. The diagram includes the MCLK and ADDR/CMD signals, which are provided by memory controller 100 to memory units 110. The diagram also shows the DQ and DQS signals, which convey data and data strobes, respectively, between buffer units 170 and memory units 110. The remaining signals: DDQ, BCMD, and CRC signal convey information between memory controller 100 and buffer units 170.

As shown, read commands (e.g., rdA and rdB) were sent to memory units 110 by memory controller 100. Several MCLK cycles later the data appears on the DQ signal paths, along with data strobe signals DQS. Prior to the data appearing on the DQ signal paths, read commands (e.g., r0, r1) are sent to buffer units 170 via the BCMD signal paths. The next MCLK cycle after the rdA data is on the DQ signal paths, the rdA data appears on the DDQ signal paths. As described above, the rdA and rdB data is conveyed in parallel from memory units 110 to buffer units 170 at twice the MCLK rate (e.g. 1600 MT/s). However, the data is conveyed serially from buffer units 170 to memory controller 100 at a much faster data rate (e.g., 6.4 GT/s).

To mitigate the bus turn-around time when transitioning from a read to a write, write data may be pre-buffered within buffer unit 170. For example, as shown the wrX data and associated BCMD write commands (e.g., w1) are sent to buffer units 170, but that data is not written to memory units 110 until later, as indicated by the dotted line.

The read/write/read sequence may described generally as follows: wrX data is written via the DDQ signal paths to buffer unit 170 by memory controller 100 and stored within buffer unit 170. Memory controller 100 concurrently issues read commands (rdA followed several MCLK cycles later by rdB) to memory units 110 via the ADDR/CMD signal paths. Just prior to the rdA data appearing on the DQ bus (e.g., at the end of the wrX data transfer on DDQ), memory controller 100 issues read commands (e.g., r0, r1) to buffer unit 170 via BCMD. While the rdA and rdB data is on the DQ bus, memory controller 100 sends write commands (e.g., wrX and wrY) via the ADDR/CMD bus to memory nits 110. The rdA and rdB data is latched within buffer unit 170 and sent via DDQ to memory controller 100. Prior to the rdB data transfer on DDQ being complete, memory controller 100 sends write commands (e.g., w0, w2, and w3) to buffer unit 170. The w2 command causes the previously stored wrX data to be written to memory units 110 while the w3 write command causes the wrY data that was just sent via the DDQ signal paths to be sent to memory units 110 via the DQ data paths. While the wrX data is being written to memory units 110, memory controller 100 issues a rdC command to memory units 110 via the ADDR/CMD signal paths. Some number of cycles later, the rdC data and data strobes appear on the DQ signal paths and DQS signal paths, respectively. As the rdC data is being transferred on the DQ data paths to buffer units 170, memory controller 100 issues the read commands (e.g., r0 and r1) to buffer units 170 via the BCMD signal paths, thus enabling buffer units 170 to send the read data via the DDQ data paths. Similar to the wrX data, the wrZ data is not written to memory units 110 during this burst. Instead it is stored within buffer unit 170 for use during the next write burst.

As described above, the CRC is generated and sent to memory controller 100 during read and write operations between memory controller 100 and buffer units 170. The CRC is generated from BCMD information, write data, and read data as indicated by the arrows. As shown, the w1, r0, w0 commands, the wrX rdA, and rdB data are used to generate the CRC information sent on the CRC signal paths from buffer units 170 to memory controller 100.

It is noted that although the above signals may cause CRC information to be generated and sent to memory controller 100, as shown, the CRC signal paths may have transitions even when the buffer units 170 are idle (i.e., not transferring data). As described above, the CRC data drives the RxCDR 282 within memory controller 100. Thus, these transitions enable the read data sample clock to be continuously phase aligned to correctly sample the read data.

Figure 4:
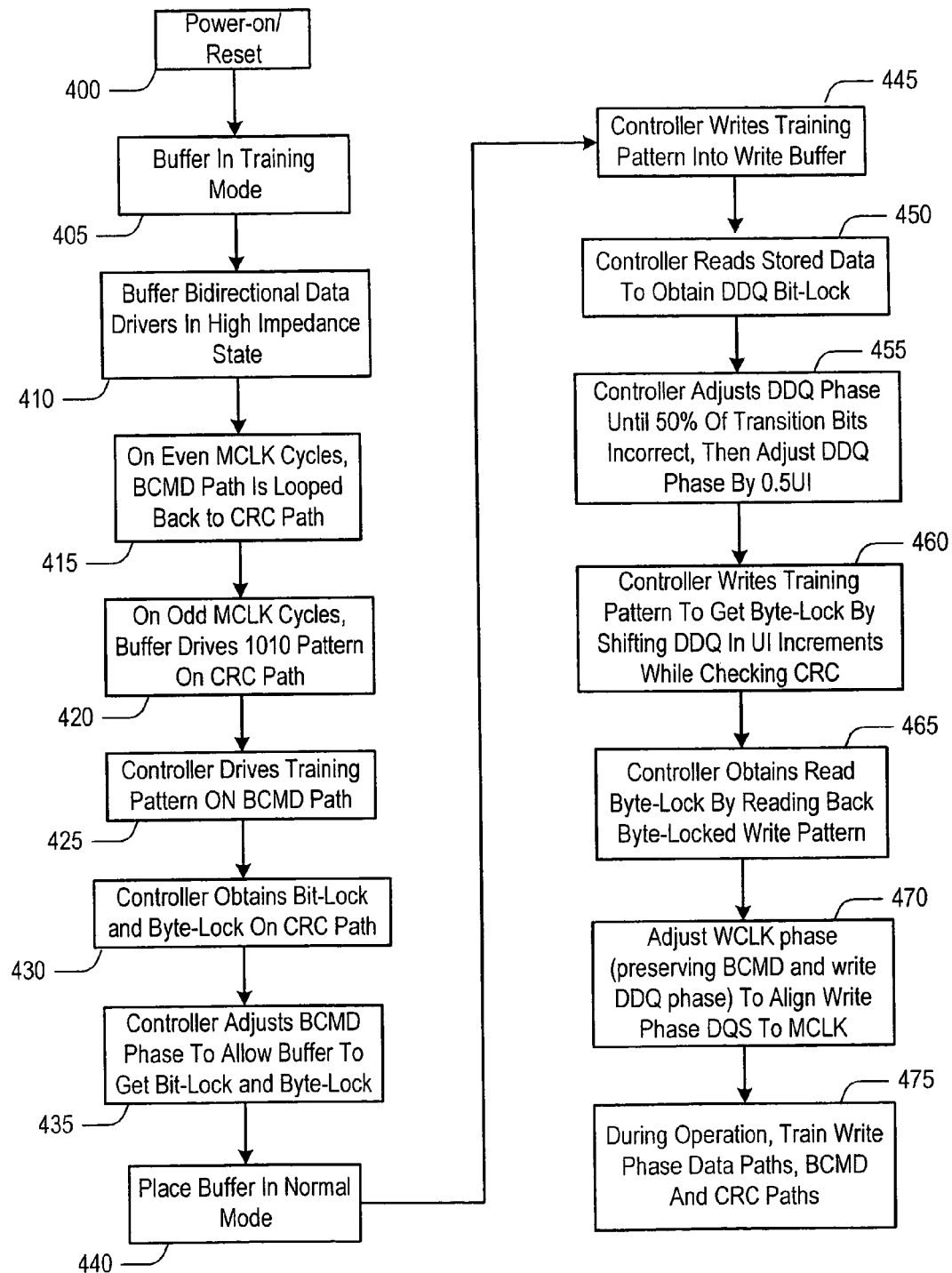
FIG. 4 is a flow diagram describing the operation of the embodiments shown in FIG. 1 through FIG. 3.

FIG. 4 is a flow diagram describing the operation of the embodiments shown in FIG. 1 and FIG. 2. As briefly described above, the interface between memory controller 100 and buffer units 170 is asymmetric. That is to say, more of the control functionality resides in memory controller 100 than in buffer units 170. Thus, during power up and at predetermined times during operation, memory controller 100 may adjust the signal characteristics (e.g., phase, etc.) of transmitted write data to enable buffer unit 170 to correctly read the data based upon information received from buffer unit 170. In addition, memory controller 100 may adjust its internal receiver characteristics to enable memory controller 100 to correctly receive data sent by buffer unit 170. Further, memory controller 100 may adjust the phase of clock signals that are provided to buffer unit 170, and to adjust the phase of the BCMD signal to enable buffer command information to be correctly sampled by buffer units 170.

Referring collectively to FIG. 1, FIG. 2 and FIG. 4, and beginning in block 400 of FIG. 4, after a reset or power-on condition (block 400), in one embodiment, control logic 255 causes buffer unit 170 to come out of reset in a training mode (block 405). Upon entering the training state, all bidirectional signal path drivers (e.g., DDQ, DQ, and DQS) may be placed in a high-impedance state (block 410). In the training mode, the BCMD signal path is looped back to the CRC signal path during even MCLK cycles (block 415), and a training pattern (e.g., 10101010 . . . ) is output on the CRC path during odd MCLK cycles (block 420). Memory controller 100 drives a training pattern on the BCMD signal path, which is output on the CRC path during the even MCLK cycles (block 425). Memory controller 100 obtains bit-lock and byte-lock receiving known data patterns on CRC path (block 430). In addition, memory controller 100 adjusts the phase of the BCMD clock signal by adjusting variable phase unit 294, so that buffer unit 170 may obtain bit-lock (i.e., bit alignment) and byte-lock (i.e., byte alignment) on the BCMD signal path (block 435). More particularly, memory controller 100 may vary (shift) the pattern being sent by one bit time (UI) to ensure that buffer unit 170 is capturing each bit correctly and shifting in the serial bits and capturing entire eight-bit bytes on the correct byte boundary. Memory controller may then send a buffer command to take buffer unit 170 out of training mode (block 440).

To train the DDQ data path, memory controller 100 sends a training pattern (e.g., random pattern having a lot of transitions) via the DDQ data paths. This pattern is stored within write FIFO 220 (block 445). Memory controller 100 reads back the stored pattern to obtain bit-lock (block 450). Memory controller 100 adjusts the phase of the write data (e.g., by adjusting variable phase unit 295) to obtain a bit error rate of substantially 50%. The 50% transition error rate may be indicative that the write data is being sampled near an edge. Memory controller 100 then adjusts the phase of the write data back by 0.5 UI. Doing so should cause FF 208, for example, to sample the data near the middle of each data bit. This process may be performed for each DDQ signal path (block 455). To obtain byte-lock, memory controller 100 sends a training pattern via DDQ data paths. In one embodiment, the training pattern may have a different pattern for each byte. While monitoring the CRC information, memory controller 100 may shift the training pattern data in one UI increments. If the CRC information is correct, byte-lock is established (block 460). Once the training pattern is byte-locked within buffer unit 170, memory controller 100 attempts to obtain read data byte-lock. In one embodiment, memory controller 100 reads back the byte-locked training pattern (block 465). At this point, the serial interconnect should be aligned such that both bit-lock and byte-lock have been obtained in the write and read directions.

As such, the parallel DRAM interface 256 may be aligned. More particularly, in one embodiment, memory controller 100 may adjust the WCLK phase while preserving the BCMD and DDQ write phase alignment, until the write phase DQS edges are aligned with the appropriate MCLK edges (block 470).

Once the buffer unit 170 serial and parallel interconnects are aligned, during normal operation memory controller 100 may perform write phase training of the serial interconnect 160 using training patterns as described above. This training may be performed at predetermined intervals. Likewise, during idle periods memory controller 100 may monitor and adjust BCMD and CRC alignment by sending a number of idle commands to buffer unit 170. These idle commands may cause predetermined transition rich CRC patterns to be sent on the CRC signal path (block 475).

Turning to FIG. 5, a block diagram of an exemplary embodiment of a computer system that includes the memory system of FIG. 1 and FIG. 2 is shown. It is noted that components that correspond to components shown in FIG. 1 and FIG. 2 are numbered identically for clarity and simplicity. Computer system 500 includes a processing node 650 coupled to memory buffers 170 and to memory units 110.

In one implementation, the buffer units 170 may be integrated circuit chips mounted to the motherboard, and the memory units 110 may plug into sockets. In another implementation, the buffer units 170 may be integrated circuit chips mounted to a daughter board that may plug into a memory daughter card socket. In such an implementation, the daughter boards may have sockets for which to plug the memory units 110 in a riser arrangement.

More particularly, the processing node 650 includes processor cores 601 coupled to a memory controller 100. It is noted that there may be any number of processor cores 601 within processing node 650. As described above, memory controller 100 signals are coupled to memory buffers 170 via a differential serial interconnect 160, and to memory units 110 via a parallel interconnect 165. As shown, the serial interconnect includes unidirectional CRC signal paths, unidirectional WCLK signal paths, unidirectional BCMD signal paths, and bidirectional data signal paths. In addition, the parallel interconnect 165 includes bidirectional data and data strobe signal paths between the memory buffers 170 and memory units 110. Further, parallel interconnect 165 includes unidirectional ADDR/CMD and MCLK signal paths between processing node 650 and memory units 110. It is noted that in addition to the ADDR/CMD signals, there may be other signals such as chip select, bank select, and others included on the parallel interconnect 165, however, they have been omitted here for simplicity. It is also noted that although not shown as such for simplicity, the MCLK and DQS signals may be differential signals.

Figure 6:
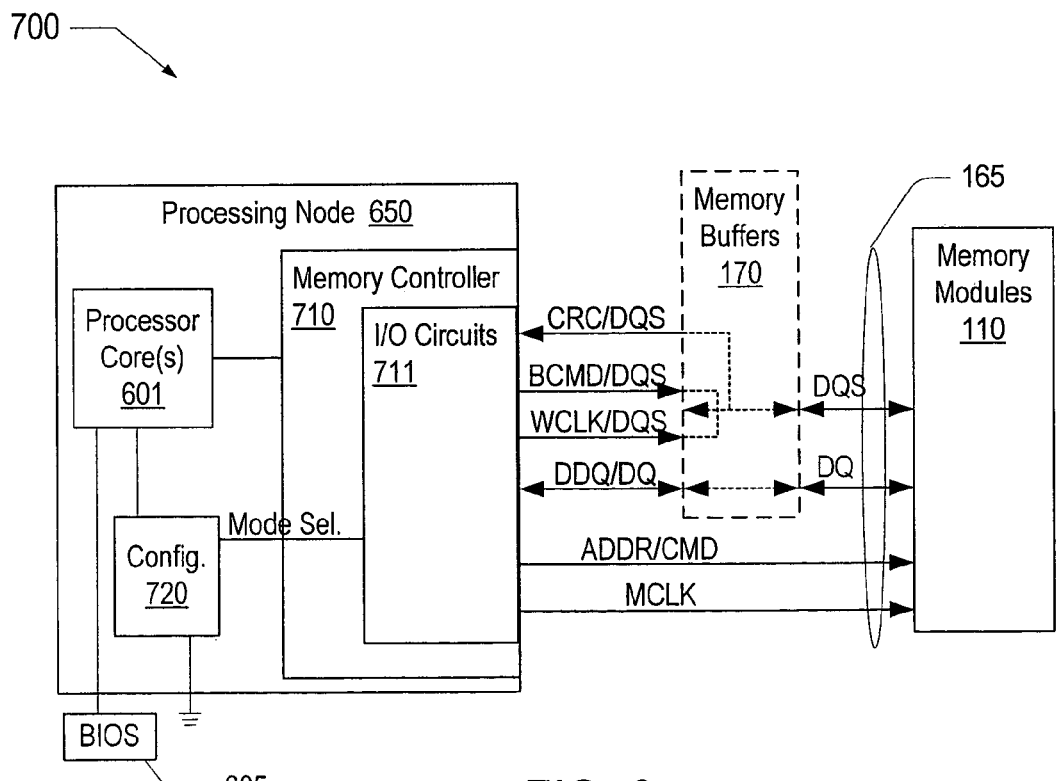
FIG. 6 is a block diagram of an embodiment of the computer system of FIG. 5 including a dual mode memory controller.

Referring to FIG. 6, a block diagram of one embodiment of a computer system including memory controller having a dual mode memory interconnect is shown. Computer system 700 is similar to computer system 500 shown in FIG. 5. For example, computer system 700 also includes a processing node 650 coupled to memory buffers 170 and to memory units 110. However in FIG. 6, memory controller 710 differs from memory controller 100 of FIG. 5 because it is a dual-mode memory controller. More particularly, as described in greater detail below, memory controller 710 may be selectively configured to operate with either a parallel interconnect to memory units 110 or a serial interconnect for use with buffer units 170.

As described briefly above, computer system architects may want to design systems having a great deal of flexibility so that their components may be used by as many system manufacturers as possible. Accordingly, in one embodiment, memory controller 710 may be configured to operate in a first mode to provide a parallel memory interconnect that may be compatible with a variety of memory specifications. For example, in various embodiments, memory units 110 may be compatible with DDR2, DDR3, or other specifications as desired. As such, memory controller 710 may provide, as its parallel interconnect, a parallel interconnect that is compatible with DDR2, and DDR3 technology, as desired. In addition, memory controller 710 may be configured to operate in a second mode to provide a differential serial interconnect such as serial interconnect 160 of FIG. 1 and FIG. 2.

As shown in FIG. 6, a configuration unit 720 may determine and select the configuration of I/O circuits 711 within memory controller 710. In one embodiment, the mode of memory controller 710 may be selected using a hardwired external pin of processing node 600. In such an embodiment, one or more external select pins of processing node 600 may be hardwired to circuit ground as shown, or to VDD or some other voltage, for example. Configuration unit 720 may detect the selection pin state, and then configure I/O circuits 711 of memory controller 710 accordingly. In another embodiment, memory controller mode may be selected during system start-up during execution of BIOS 605 or other system level software.

In the illustrated embodiment, in the first mode memory controller 710 is coupled directly to memory units 110. In such a configuration, I/O circuits 711 is a parallel interconnect that includes signal paths such as DQ, DQS, ADDR/CMD, and MCLK, for example. In the second mode, the I/O circuits 711 changes to a differential serial interconnect that is coupled to memory buffer unit 170 (dotted line) such as shown in FIG. 1, FIG. 2, and FIG. 5.

To accomplish the mode switch, I/O circuits 711 may include a plurality of output drivers and input buffers. Some of the drivers and buffers may be differential circuits and some may be single-ended. In one embodiment, depending on the mode, the connections between the various I/O pins of the processing node and the drivers and buffers may be changed. Thus, in one embodiment, portions of I/O circuits 711 may operate like a programmable interconnect.

For example, as shown in FIG. 6, the CRC/DQS signal paths may change between bidirectional DQS signal paths and unidirectional CRC signal paths. The DQS/BCMD may also change between bidirectional DQS signal paths and unidirectional BCMD signal paths. In addition, the WCLK/DQS signal paths may change between bidirectional DQS signal paths and unidirectional WCLK signal paths. Further, the DDQ/DQ signal paths may change between bidirectional single ended DQS signal paths and bidirectional differential data DDQ signal paths.

Figure 7:
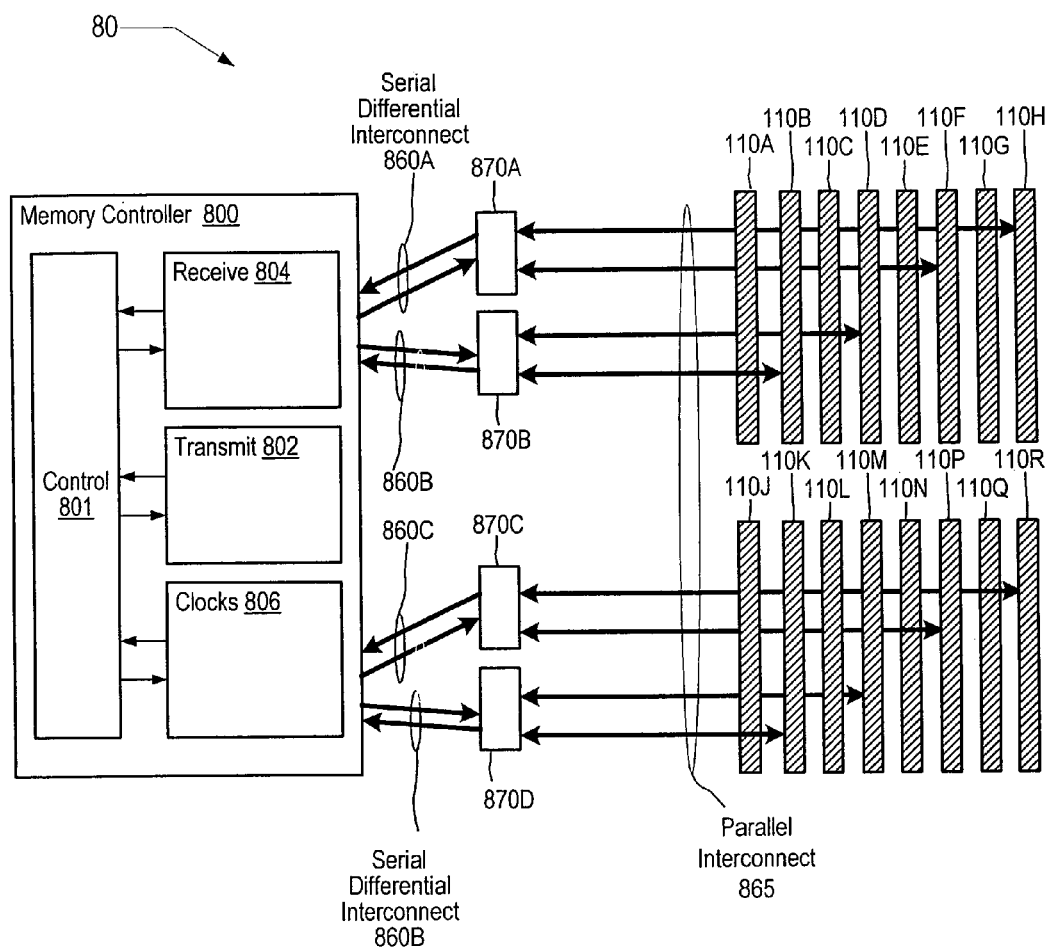
FIG. 7 is a block diagram of one embodiment of a memory system including memory controller having a dual mode interface.
Figure 10:
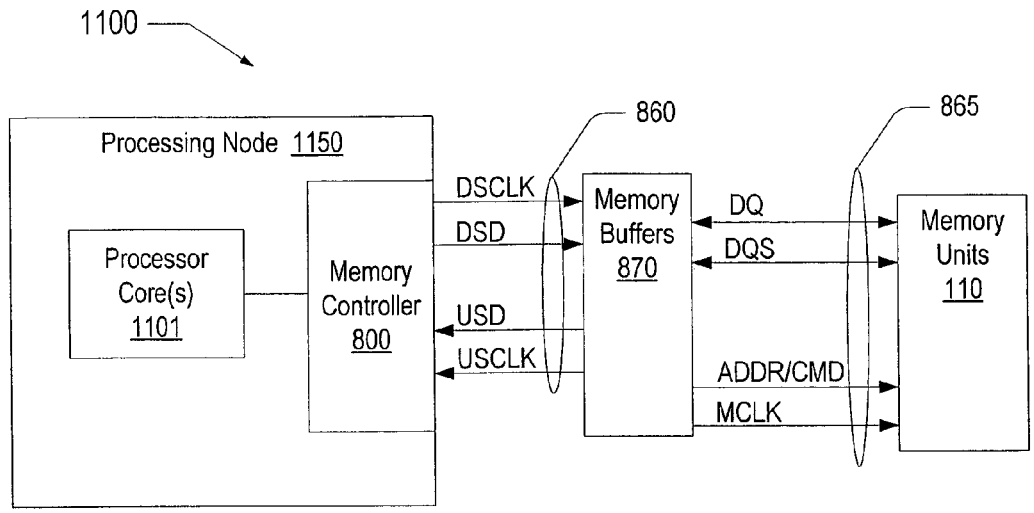
FIG. 10 is a block diagram of one embodiment of a computer system including the memory system shown in FIG. 7.

Turning to FIG. 7, a block diagram of another embodiment of a memory system including a high-speed buffer is shown. The memory system 80 includes a memory controller 800 coupled to memory units 110A through 110H, and to buffer units 870A through 870D. It is noted that similar to the memory controller shown in FIG. 1, memory controller 800 may also be a memory controller that is part of a chipset, such as may be used in a Northbridge arrangement. Alternatively, as shown in FIG. 10, memory controller 800 may be part of an embedded solution in which memory controller 800 is embedded within a processing node including one or more processor cores, for example.

Components that correspond to those shown in previous diagrams are numbered identically for clarity and simplicity. As such, in one implementation, memory units 110A-110H may be representative of memory modules such as dual in-line memory modules (DIMM), for example, as described above. In various implementations the memory units may conform to various technologies such as DDR2 and DDR3, for example.

In the illustrated embodiment, memory controller 800 is coupled to buffer units 870 via a serial interconnect 860A through 860D. In one embodiment, each serial interconnect 860 uses differential signaling techniques. As will be described in greater detail below in conjunction with the description of FIG. 8, serial differential interconnects 860A-860D may each include an upstream link and a downstream link to each buffer unit 870. A downstream link may include a plurality of downstream serial data signal paths (DSD) and a corresponding downstream serial clock signal path (DSCLK) that may be used to clock the data into buffer units 870. Similarly, each upstream link may include a plurality of upstream serial data signal paths (USD) and a corresponding upstream serial clock signal path (USCLK) that may be used to clock the data into memory controller 800. In the illustrated embodiment, there are four memory channels shown, although other numbers are possible. As such, serial interconnect 860A may be used for one channel and is thus coupled to buffer unit 870A, serial interconnect 860B may be used for the second channel and is coupled to buffer units 870B, serial interconnect 860C may be used for the third channel and is coupled to buffer units 870C, and serial interconnect 860D may be used for the fourth channel and is coupled to buffer units 870D.

In contrast to the serial interconnect 160 used in the embodiments described above, serial interconnect 860 uses data signal paths that each convey data, CRC, and ADDR/CMD information. As such, in one embodiment, serial interconnect 860 may use a packet protocol in which the packets may include encodings to designate whether the payload is ADDR/CMD or data. In addition, each packet may have a format that has dedicated bit times for CRC information, and payload (e.g., data or ADDR/CMD).

In addition, buffer units, 870A-870D are coupled to memory units 110 via parallel interconnect 865. In one embodiment, parallel interconnect 865 may include data paths (DQ), data strobe signal paths (DQS), address/command signal paths (ADDR/CMD), and clock signal paths (MCLK). It is noted that there may be other signals such as chip select, bank select, check bits, and others included on the parallel interconnect 865, however, they have been omitted here for simplicity. It is also noted that parallel interconnect 865 may include four channels. As shown, one of the channels is coupled to memory units 110A through 110D, another is coupled to memory units 110E through 110H, another is coupled to memory units 110J through 110M, and another is coupled to memory units 110N through 110R.

As will be described in greater detail below, the DQ data paths may convey data in both directions between the buffer units 870 and memory units 110, while the differential data paths of the serial interconnects 860 may convey serially the data that was conveyed via the parallel interconnect, and at higher speeds. For example, a given uplink USD[0] or downlink DSD [0] signal path may convey data bits corresponding to DQ [0:3], the USD[1] signal path may convey data bits corresponding to DQ [4:7], and the like, although other mappings are possible. It in some embodiments, the serial links may be asymmetric in terms of the number of serial data pins. In one implementation, the uplink may have more data signal paths than the downlink, since it is assumed more bandwidth may be consumed by read operations than by write operations.

Similar to the buffer units 170 described above, each serial interconnect 860 may transfer data at four times the rate at which parallel interconnect 865 transfers data on the data signal paths. However, the ADDR/CMD signal paths and the MCLK signal paths may operate at half the rate of data paths of parallel interconnect 865. For example, the serial interconnect 860 may transfer data on the uplink and downlink data paths at 6.4 GT/s, while the data signal paths DQ/DQS of parallel interconnect 865 may transfer data at 1600 MT/s, and the ADDR/CMD and MCLK signal paths may operate at 800 MT/s. It is noted that the serial interconnect 860 may be operated at any suitable data rate in relation to parallel interconnect 865.

In one embodiment, memory controller 800 may control the operation of buffer units 870 via commands sent on the DSD signal paths. As such, buffer units 870 may have a normal operation mode and a configuration and test mode. For example, during normal data operations memory controller 800 may send read and write commands for both data and pre- and post-ambles, to read and write the data storage, and to adjust the phase offset of the DQ signal paths. In addition, memory controller 800 may control the configuration, training and testing of the buffer units 870 by sending a variety of loopback commands, CRC control commands, and CRC training pattern commands, for example.

Figure 8:
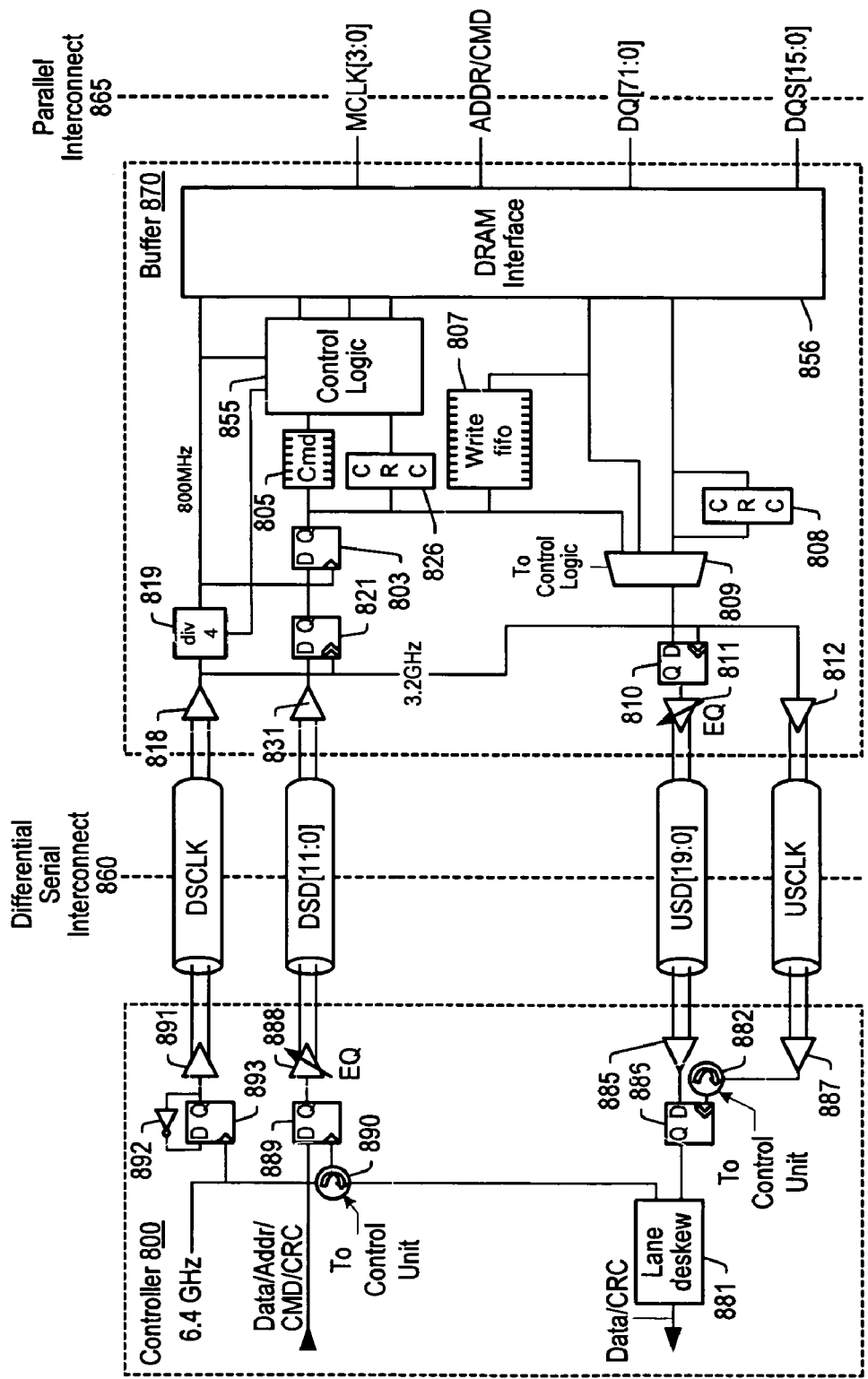
FIG. 8 a diagram illustrating more detailed aspects of the memory system components of FIG. 7.

At high data rates the probability of buffer unit 870 or memory controller 800 receiving a bit error is significant. Accordingly, it may be necessary to protect transfers between memory controller 800 and buffer units 870 with an error detection code that will robustly detect multiple bit errors within a protected block. In one embodiment, a CRC code may be used to provide such multiple bit error detection. More particularly, as shown in FIG. 8, CRC information may be generated and sent in both the uplink and the downlink. When an error is detected on the serial interconnect in either direction, memory controller 800 may correct the error by retrying the operation. In one embodiment, a CRC error detected in the downstream link may be encoded into the upstream CRC.

In one embodiment, memory controller 800 may include control functionality that may dynamically and adaptively adjust the signal characteristics (e.g., phase, etc.) of transmitted write data to enable buffer unit 870 to correctly read the data based upon information received from buffer unit 870. In addition, memory controller 800 may adjust its internal receiver characteristics to enable memory controller 100 to receive data sent by buffer unit 870. Further, memory controller 800 may adjust the phase of clock signals that are provided to buffer unit 870 to enable address and command information to be correctly sampled.

More particularly, at high data rates the uncertainties of delays in the transmission path for different signals in a bus may require a per bit phase adjustment of a sample clock of a receiver of those signals. To avoid employing this circuitry in buffer unit 870, memory controller 800 may adjust the phase of its transmitted clock and data signals to avoid complex phase shifting circuits in the slave. As such, in the illustrated embodiment, memory controller 800 includes a control unit 801 that is coupled to a transmit unit 802, a receive unit 804, and a clocks unit 806. Control unit 801 may calculate phase information based on data received from buffer units 870 that may be used to adjust the phase of various clock edges within memory controller 800. For example, in response to such information as CRC data and read data, control unit 801 may control phase tracking and adjustment circuits (shown in FIG. 8) within transmit unit 802, receive unit 804, and clocks unit 806, respectively. This functionality is described in greater detail below in conjunction with the descriptions of FIG. 8 and FIG. 9.

Referring to FIG. 8, a diagram illustrating more detailed aspects of the memory system components of FIG. 7 is shown. Components that correspond to those shown in FIG. 7 are numbered identically for clarity and simplicity. Memory controller 800 is coupled to serial buffer unit 870 via a differential serial interconnect 860. It is noted that buffer unit 870 may be representative of any of buffer units 870A through 870D shown in FIG. 7. Accordingly, differential serial interconnect 860 includes a downstream differential serial clock signal path (DSCLK), and downstream differential data signal paths DSD[11:0]. Similarly, differential serial interconnect 860 includes an upstream differential serial clock signal path (USCLK), and upstream differential data signal paths USD[19:0]

Memory controller 800 includes a 6.4 GHz clock signal, which may be generated by clocks unit 806 of FIG. 7. In one embodiment, the 6.4 GHz clock is the internal clock for memory controller 800. The output of variable phase unit 890 provides the clock signal for flip-flop (FF) 889. The 6.4 GHz clock is also coupled to lane deskew circuit 881, and to the clock input of FF 893 to generate the serial clock DSCLK. Since FF 893 has an inverter 892 coupled in a feedback loop to the input, the 6.4 GHz clock is divided by two and output as a 3.2 GHz serial clock. The 3.2 GHz clock is driven differentially by differential output driver 891.

In the illustrated embodiment, the write data, ADDR/CMD, and CRC is provided to the input of FF 889. The output of FF 889 is coupled to a differential equalization output driver 888. The output of driver 888 is coupled to one signal path of DSD[11:0]. Thus, for each signal path of DSD[11:0], a similar output path (not shown) may be used. Likewise, for read data, one signal path of USD[19:0] is coupled to a differential input buffer 885, the output of which is coupled to the input of FF 886. The output of FF 886 is coupled to the input of Lane deskew unit 881. The output of lane deskew unit 881 is provided as read data and CRC information to other portions (not shown) of memory controller 800. The upstream serial clock signal USCLK is coupled to differential input buffer 887, the output of which is coupled to variable phase unit 882. The output of which is coupled to the clock input of FF 886.

Buffer unit 870 includes a buffer 831 that represents a differential input buffer for each of the DSD[11:0] signal paths. Buffer 831 is coupled to receive the write data, ADDR/CMD, and CRC information sent on one of the DSD[11:0] signal paths. Thus, similar to memory controller 800, for each signal path of DSD[11:0], a similar output path (not shown) may be used. The output of buffer 831 is coupled to an input of FF821. The output of FF821 is coupled to the input of FF803. The output of FF803 is coupled to a command buffer 805, CRC unit 826, write FIFO 807, and an output multiplexer (mux) 809. The output of write FIFO 807 is coupled to a DRAM interface 856, which is similar to the DRAM interface describe above in conjunction with the description of FIG. 2. As shown, there are four MCLK signals, ADDR/CMD signals, 16 data strobe signal paths DQS[15:0], and 72 data signal paths DQ[71:0] as part of parallel interconnect 865. The write data from write FIFO 807 may be output to the memory units 110 via DQ[71:0]. It is noted that other signals have been omitted for simplicity. It is noted that although not shown as such for simplicity, the MCLK and DQS signals may be differential signals.

Read data from memory units 110 via DQ[71:0] may be coupled through DRAM interface 856 to one input of a mux 809. The output of mux 809 is provided to an input of FF 810. Control logic 855 controls the multiplexer input select of mux 809. The output of FF 810 is coupled to a differential equalization data output driver 811 which is coupled to one of the differential signal paths of USD[19:0]. Buffer unit 870 also includes control logic 855 which is coupled to receive the command information (CMD) from memory controller 800. The CMD information may cause control logic 855 to drive write data onto the DQ data paths, or to read data for the DQ data paths, or to enter and exit initialization, and test sequences, etc. Thus, control logic 855 may control the DRAM interface 856, CRC units 826 and 808, mux 809, as well as other circuits.

In the illustrated embodiment, the 3.2 GHz clock is coupled to the clock input of FF 810 and to the input of differential equalization data output driver 812, the output of which is the upstream serial clock USCLK. The 3.2 GHz clock signal is also coupled to the Divide by four unit 804, thus providing and internal 800 MHz clock domain, which is the MCLK domain.

In one embodiment, the packets received via the DSD[11:0] signal paths may be provided to CMD buffer 805, write FIFO 807, and CRC unit 826 concurrently. Since the packets may be encoded to designate them as either ADDR/CMD or data payload, the CMD buffer 805 and write FIFO 807 may include packet decode logic (not shown) to enable them to capture their respective packets. Thus, when a write data payload packet is received, the packet may be decoded by write FIFO 807 and the data is stored within write FIFO 807. CMD buffer 805 may discard data payload packets. Write FIFO 807 may store the write data until enough bits are received to be output to the memory units 110 via DRAM interface 856. Similarly, when a CMD payload packet is received, the packet may be decoded by CMD buffer 805 and the CMD information is stored within CMD buffer 805. Write FIFO 807 may discard CMD payload packets. Since all packets may include CRC payload, CRC unit 826 receives all packets and extracts the CRC information.

As will be described in greater detail below in conjunction with the description of FIG. 9, during operation, memory controller 800 may dynamically and adaptively adjust the signal characteristics (e.g., phase, etc.) of transmitted write data and received read data. More particularly, as mentioned above, receive unit 804 includes sample clock phase adjustment circuits such as lane deskew 881, and variable phase units 890 and 882 to adjust its own local sample clock phase to more optimally receive data transmitted by buffer unit 870. As such, whenever memory controller 800 is receiving CRC data from buffer unit 870, receive unit 804 may use lane deskew and variable phase unit 882 to adjust the clock phase of FF 885. In addition, control unit 801 within memory controller 800 may adjust variable phase unit 890 to adjust the phase of the write data transmitted to buffer unit 870 to enable buffer unit 870 to more optimally receive the write data.

Figure 9:
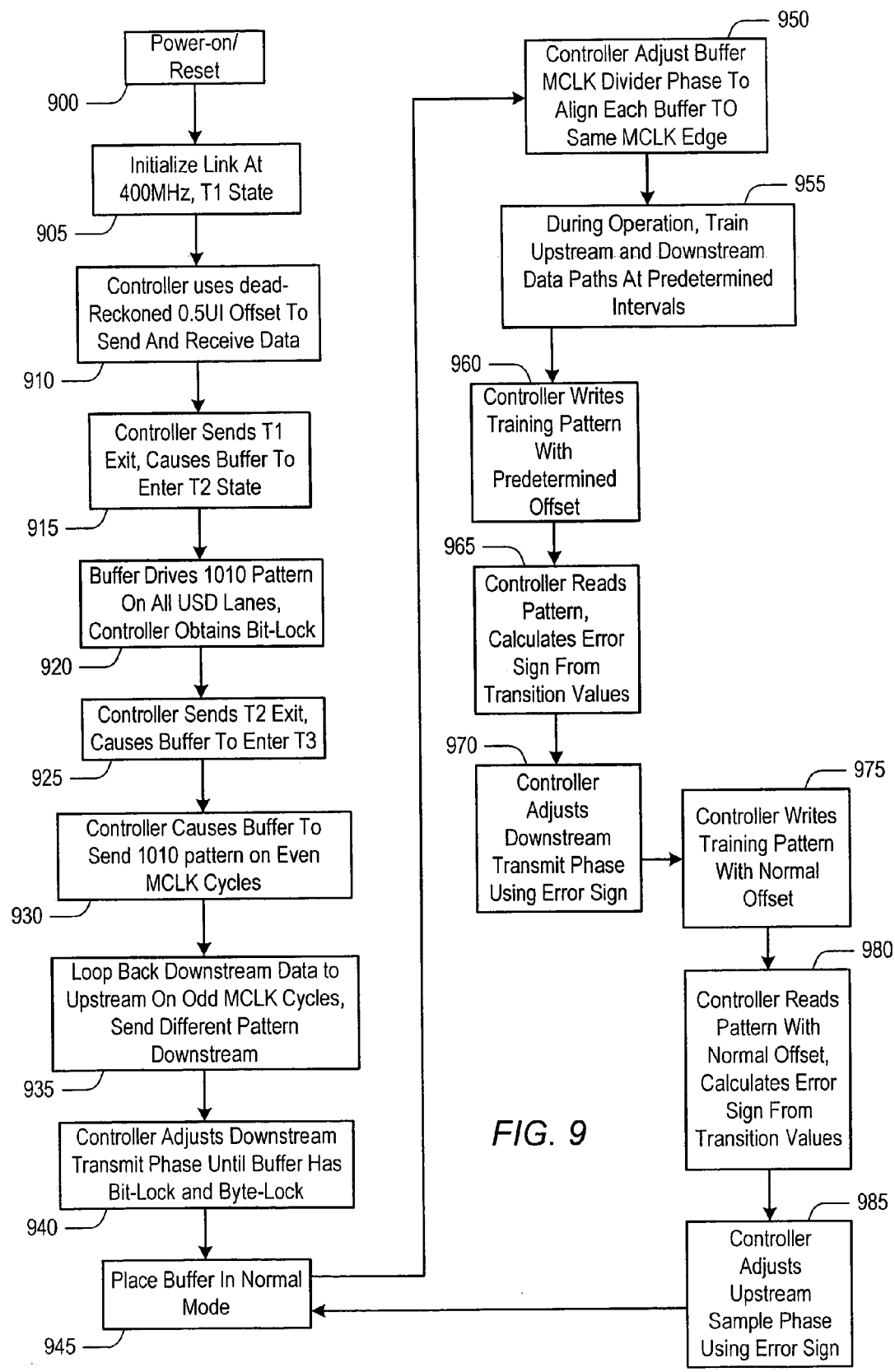
FIG. 9 is a flow diagram describing the operation of the embodiments shown in FIG. 7 and FIG. 8.

FIG. 9 is a flow diagram describing exemplary operation of the embodiments shown in FIG. 7 and FIG. 8. More particularly, an initialization and configuration procedure for establishing and maintaining communication between memory controller 800 and buffer units 870 is described. Referring collectively to FIG. 7 through FIG. 9, and beginning in block 900 of FIG. 9, when the system is reset such as during a power-on reset or other system reset condition, none of the serial signal paths can be considered to be aligned. As such, memory controller and buffer unit 870 comes out of reset in a training state 1, or T1. In the T1 state serial interconnect 860 is operated at 400 MT/s (block 905). Memory controller 800 uses a dead-reckoned 0.5 UI offset to send and receive data (block 910). For example, memory controller adjusts the offset to be an approximated point halfway across a given bit time. Memory controller 800 sends a command to cause buffer unit 870 to exit the T1 state and to enter the T2 state (block 915). In the T2 state, buffer unit 870 drives a predetermined pattern such as a 101010 . . . pattern on all bit lanes of the USD link. Memory controller obtains bit-lock using the known pattern and adjusts the variable phase unit 882, for example (block 920).

In one embodiment, memory controller 800 sends a buffer command to cause buffer unit 870 to exit the T2 state and to enter the T3 state by driving all ones for eight bit times (block 925), for example. In the T3 state, buffer unit 870 sends a predetermined pattern such as 101010 . . . to memory controller 800 via the USD signal paths on even MCLK cycles (block 930). Buffer unit 870 is configured to loop back the downstream data to the upstream USD signal paths on odd MCLK cycles and to send downstream via the DSD signal paths a different pattern than the 101010 . . . pattern (block 935). Memory controller 800 obtains byte-lock using the different patterns. Memory controller 800 then adjusts the downstream data phase to allow buffer unit 870 to obtain bit-lock and byte lock (block 940). When complete, memory controller 800 drives all zeros for eight bit times causing buffer unit 870 to exit the T3 state and to enter the normal operational mode block (945), where memory controller 800 may read and write data to memory units 110, etc.

Once in the normal operational mode, memory controller 800 may adjust the divide-by-four MCLK divider 804, within each buffer unit 870 such that all buffer units 870 may be using the same clock edge (phase) (block 950). More particularly, memory controller 800 may send buffer commands to retard the MCLK phase by one or more bit times.

At predetermined intervals during normal operation (e.g., every 100 us), memory controller 800 may train the upstream and downstream signal paths (block 955) using a periodic training mode. For example, for downstream training memory controller 800 may write a training pattern to write FIFO 807 using a predetermined training phase offset (block 960). Memory controller 800 may then read back the training pattern and calculate an error sign from the transition values of the pattern (block 965). Using the calculated error sign, memory controller 800 may adjust the downstream data phase (block 970).

For upstream training, memory controller 800 may write a training pattern to write FIFO 807 using a normal phase offset (block 975). Memory controller 800 may then read back the stored training pattern and calculate an error sign from the transition values of the pattern using another predetermined training phase offset (block 980). Using the calculated error sign, memory controller 800 may adjust the upstream sample phase (block 985). Once the periodic training is complete, buffer unit 870 is placed back into normal mode as describe above in block 945.

Turning to FIG. 10, a block diagram of one embodiment of a computer system including the memory system of FIG. 7 is shown. It is noted that components that correspond to components shown in FIG. 7 and FIG. 8 are numbered identically for clarity and simplicity. Computer system 1100 includes a processing node 1150 coupled to memory buffers 870 and to memory units 110.

Similar to the computer system shown in FIG. 5, in one implementation, the buffer units 870 may be integrated circuit chips mounted to the motherboard, and the memory units 110 may plug into sockets. In another implementation, the buffer units 870 may be integrated circuit chips mounted to a daughter board that may plug into a memory daughter card socket. In such an implementation, the daughter boards may have sockets for which to plug the memory units 110 in a riser arrangement.

In the embodiment shown in FIG. 10, the processing node 1150 includes processor cores 1101 coupled to a memory controller 800. It is noted that there may be any number of processor cores 1101 within processing node 1150. As described above in conjunction with the descriptions of FIG. 7 and FIG. 8, memory controller 800 signals are coupled to memory buffers 870 via a differential serial interconnect 860, and to memory units 110 via a parallel interconnect 865. As shown, the serial interconnect 860 includes unidirectional downstream signal paths, unidirectional downstream clock signal paths, unidirectional upstream signal paths, and unidirectional upstream clock signal paths. In addition, the parallel interconnect 865 includes bidirectional data and data strobe signal paths between the memory buffers 870 and memory units 110. Further, parallel interconnect 865 includes unidirectional ADDR/CMD and MCLK signal paths between processing node 1150 and memory units 110. It is noted that in addition to the ADDR/CMD signals, there may be other signals such as chip select, bank select, and others included on the parallel interconnect 865, however, they have been omitted here for simplicity.

Figure 11:
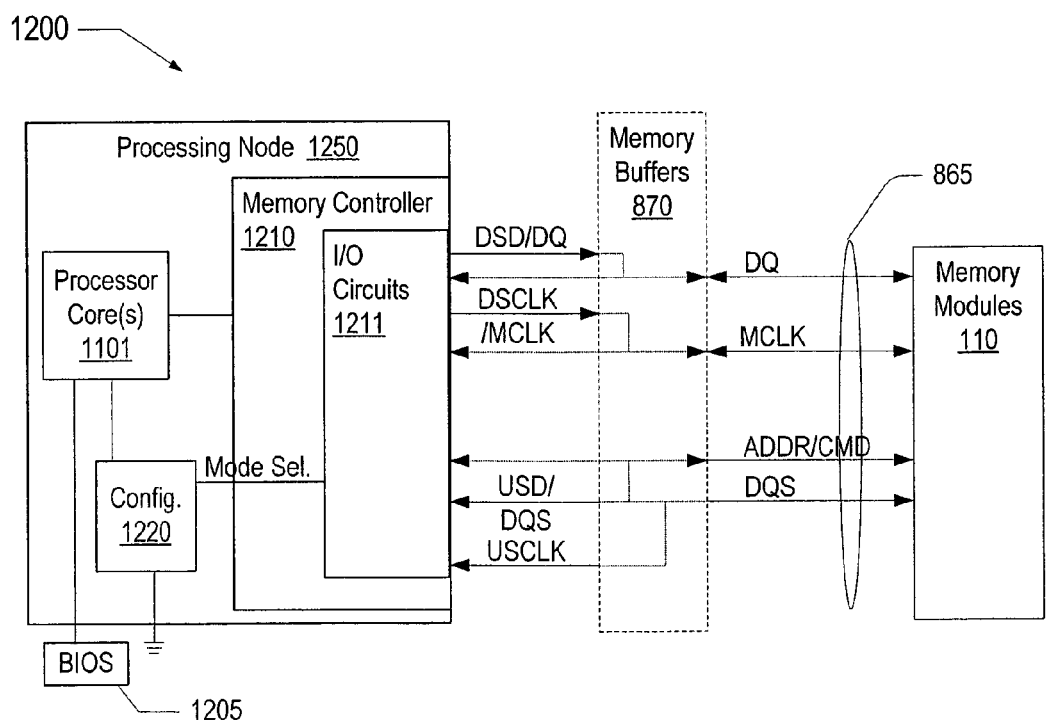
FIG. 11 is a block diagram of an embodiment of the computer system of FIG. 10 including a dual mode memory controller.

Referring to FIG. 11, a block diagram of another embodiment a computer system including a memory controller having a dual-mode memory interconnect is shown. Computer system 1200 is similar to computer system 1100 shown in FIG. 10. For example, computer system 1200 also includes a processing node 1250 coupled to memory buffers 870 and to memory units 110. However in FIG. 11, memory controller 1210 differs from memory controller 800 of FIG. 10 because it is a dual-mode memory controller. More particularly, as described in greater detail below, memory controller 1210 may be selectively configured to operate with either a parallel interconnect 865 for direct connection to memory units 110 or a serial interconnect 860 for use with buffer units 870 as described above in conjunction with the description of FIG. 7 and FIG. 8.

Similar to the memory controller 710 described above, memory controller 1210 of FIG. 11 may also selectively operate with either a parallel interconnect for direct connection to memory modules that may be compatible with a variety of memory specifications. For example, in various embodiments, memory units 110 may be compatible with DDR2, DDR3, or other specifications as desired. As such, memory controller 1210 may provide, as its parallel interconnect, a parallel interconnect 865 that is compatible with DDR2, and DDR3 technology, as desired. In addition, memory controller 1210 may also be selectively configured to operate in a second mode to provide a serial differential interconnect such as serial interconnect 860 of FIG. 7 and FIG. 8 for connection to buffer units 870.

As shown in FIG. 11, a configuration unit 1220 may determine and select the configuration of I/O circuits 1211 within memory controller 1210. In one embodiment, the mode of memory controller 1210 may be selected using a hardwired external pin of processing node 1250. In such an embodiment, one or more external select pins of processing node 1250 may be hardwired to circuit ground as shown, or to VDD or some other voltage, for example. Configuration unit 1220 may detect the selection pin state, and then configure I/O circuits 1211 of memory controller 1210 accordingly. In another embodiment, memory controller mode may be selected during system start-up during execution of BIOS 1205 or other system level software.

In the illustrated embodiment, in the first mode memory controller 1210 is coupled directly to memory units 110. In such a configuration, I/O circuits 1211 provides a parallel interconnect that includes signal paths such as DQ, DQS, ADDR/CMD, and MCLK, among others, for example. In the second mode, the I/O circuits 1211 changes to a differential serial interconnect that is coupled to memory buffer unit 870 (dotted lines) such as shown in FIG. 7, FIG. 8, and FIG. 10.

To accomplish the mode switch, I/O circuits 1211 may include a plurality of output drivers and input buffers. Some of the drivers and buffers may be differential circuits and some may be single-ended. In one embodiment, depending on the mode, the connections between the various I/O pins of the processing node and the drivers and buffers may be changed. Thus, in one embodiment, portions of I/O circuits 1211 may operate like a programmable interconnect.

For example, as shown in FIG. 11 the DSD signal paths may change between unidirectional differential DDS signal paths and bidirectional single-ended DQ signal paths, as desired. In addition, the USD signal paths may change between unidirectional UDS signal paths and bidirectional single-ended ADDR/CMD signal paths, and/or bidirectional differential DQS signal paths. Further, the DSCLK signal paths may also change between a differential unidirectional clock signal path to one or more single-ended MCLK signal paths, etc. It is noted that other pin combinations are possible and contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A memory controller comprising:
   an input/output (I/O) circuit including a plurality of input buffers and a plurality of output drivers, wherein the I/O circuit is configured to operate in one of a first mode and a second mode dependent upon a state of a mode selection signal;
   wherein during operation in the first mode, the I/O circuit is configured to provide a parallel interconnect for direct connection between the memory controller and one or more memory modules, wherein the parallel interconnect includes one or more clock signal paths each configured to convey a parallel clock signal from the memory controller to the one or more memory modules;
   wherein during operation in the second mode, the I/O circuit is configured to provide a respective serial interconnect for connection to a corresponding one of one or more buffer units interposed between the memory controller and the one or more memory modules, wherein each buffer unit is configured to buffer memory data that is being read from or written to the one or more memory modules;
   wherein each respective serial interconnect includes a plurality of differential bidirectional data signal paths, each configured to convey data at a first data transfer rate according to a serial clock signal between a corresponding buffer unit of the one or more buffer units and the memory controller; and
   wherein during operation in the first mode, each parallel clock signal operates at a second data transfer rate, wherein the first data transfer rate is faster than the second rate.

2. The memory controller as recited in claim 1, wherein each respective serial interconnect includes a differential command signal path configured to convey the command information from the memory controller to a corresponding buffer unit of the one or more buffer units.

3. The memory controller as recited in claim 1, further comprises a configuration unit coupled to the I/O circuit and configured to detect which of the first and the second modes to select and provide the mode select signal to the I/O circuit.

4. The memory controller as recited in claim 1, wherein each respective serial interconnect includes a differential clock signal path configured to convey the serial clock signal from the memory controller to a given buffer unit of the one or more buffer units, wherein each of the serial clock signals operates at the first data transfer rate.

5. The memory controller as recited in claim 1, wherein the parallel interconnect includes a plurality of bidirectional data signal paths each configured to convey data between the memory controller and particular ones of the one or more memory modules.

6. The memory controller as recited in claim 1, wherein the parallel interconnect includes a plurality of bidirectional data strobe signal paths configured to convey data strobes between the memory controller and particular ones of the one or more memory modules.

7. The memory controller as recited in claim 1, wherein the parallel interconnect includes a plurality of unidirectional address and command signal paths configured to convey address and command information from the memory controller to the one or more memory modules.

8. The memory controller as recited in claim 1, wherein each of the respective serial interconnects is configured to convey from the one or more buffer units to the memory controller, cyclic redundancy code (CRC) information via one or more unidirectional CRC signal paths, wherein the CRC information corresponds to the data sent by the memory controller via the respective serial interconnect.

9. The memory controller as recited in claim 1, wherein each respective serial interconnect includes a plurality of downstream differential unidirectional signal paths each configured to convey data, address, and command information from the memory controller to the one or more buffer units.

10. The memory controller as recited in claim 9, wherein each respective serial interconnect includes a downstream unidirectional differential clock signal path configured to convey a serial clock signal from the memory controller to each of the one or more buffer units.

11. The memory controller as recited in claim 1, wherein each respective serial interconnect includes a plurality of upstream differential unidirectional signal paths each configured to convey data and cyclic redundancy code (CRC) information from one of the one or more buffer units to the memory controller.

12. The memory controller as recited in claim 1, wherein each respective serial interconnect includes an upstream unidirectional differential clock signal path configured to convey a serial clock signal from one of the one or more buffer units to the memory controller.

13. A computer system comprising:
    a processor; and
    a memory controller coupled to the processor, wherein the memory controller includes:
        an input/output (I/O) circuit including a plurality of input buffers and a plurality of output drivers, wherein the I/O circuit is configured to operate in one of a first mode and a second mode dependent upon a state of a mode selection signal;
        wherein during operation in the first mode, the I/O circuit is configured to provide a parallel interconnect for direct connection between the memory controller and one or more memory modules, wherein the parallel interconnect includes one or more clock signal paths each configured to convey a parallel clock signal from the memory controller to the one or more memory modules;
        wherein during operation in the second mode, the I/O circuit is configured to provide a respective differential serial interconnect for connection to a corresponding one of one or more buffer units interposed between the memory controller and the one or more memory modules, wherein each buffer unit is configured to buffer memory data that is being read from or written to the one or more memory modules;
        wherein each respective differential serial interconnect includes a plurality of differential bidirectional data signal paths, each configured to convey data at a first data transfer rate according to a serial clock signal between a corresponding buffer unit of the one or more buffer units and the memory controller; and
        wherein during operation in the first mode, each parallel clock signal operates at a second data transfer rate, wherein the first data transfer rate is faster than the second transfer rate.

14. The computer system as recited in claim 13, wherein each respective serial interconnect includes a differential command signal path configured to convey the command information from the memory controller to a corresponding buffer unit of the one or more buffer units.

15. The computer system as recited in claim 13, further comprises a configuration unit coupled to the I/O circuit and configured to detect which of the first and the second modes to select and provide the mode select signal to the I/O circuit.

16. The computer system as recited in claim 13, wherein each respective serial interconnect includes a differential clock signal path configured to convey a first clock signal from the memory controller to a given buffer unit of the one or more buffer units, wherein each of the differential clock signals operates at the first data transfer rate.

17. The computer system as recited in claim 13, wherein the parallel interconnect includes:
    a plurality of bidirectional data signal paths each configured to convey data between the memory controller and particular ones of the one or more memory modules;
    a plurality of bidirectional data strobe signal paths configured to convey data strobes between the memory controller and particular ones of the one or more memory modules; and
    a plurality of unidirectional address and command signal paths configured to convey address and command information from the memory controller to the one or more memory modules.

18. The computer system as recited in claim 13, wherein each respective serial interconnect includes a plurality of downstream differential unidirectional signal paths each configured to convey data and command information from the memory controller to the one or more buffer units.

19. The computer system as recited in claim 18, wherein each respective serial interconnect includes a downstream unidirectional differential clock signal path configured to convey a serial clock signal from the memory controller to each of the one or more buffer units.

20. The computer system as recited in claim 13, wherein each respective serial interconnect includes a plurality of upstream differential unidirectional signal paths each configured to convey data and cyclic redundancy code (CRC) information from one of the one or more buffer units to the memory controller.

21. The computer system as recited in claim 13, wherein each respective serial interconnect includes an upstream unidirectional differential clock signal path configured to convey a serial clock signal from one of the one or more buffer units to the memory controller.

* * * * *